F. RICHARDSON.
Vent and Check Valve.

No. 215,163.  Patented May 6, 1879.

WITNESSES:
Joseph A. Miller Jr
William D. Roys.

INVENTOR:
Frederick Richardson
by Joseph A. Miller
Attorney

UNITED STATES PATENT OFFICE.

FREDERICK RICHARDSON, OF PROVIDENCE, RHODE ISLAND.

IMPROVEMENT IN VENT AND CHECK VALVES.

Specification forming part of Letters Patent No. 215,163, dated May 6, 1879; application filed February 3, 1879.

*To all whom it may concern:*

Be it known that I, FREDERICK RICHARDSON, of the city and county of Providence, and State of Rhode Island, have invented a new and useful Improvement in Vent and Check Valves; and I hereby declare that the following is a full, clear, and exact description of the same, reference being had to the accompanying drawings, forming part of this specification.

Figure 1:
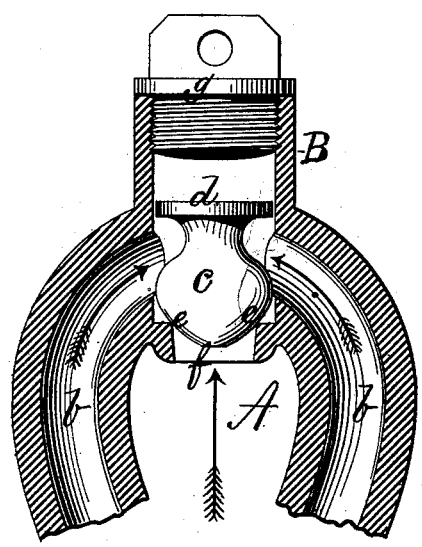
Figure 2:
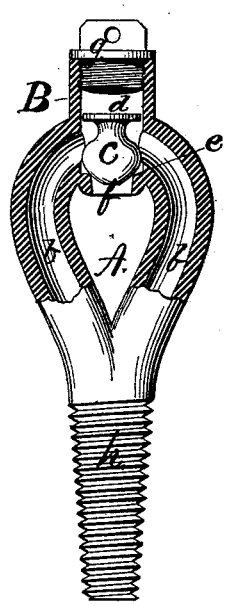
Figure 3:
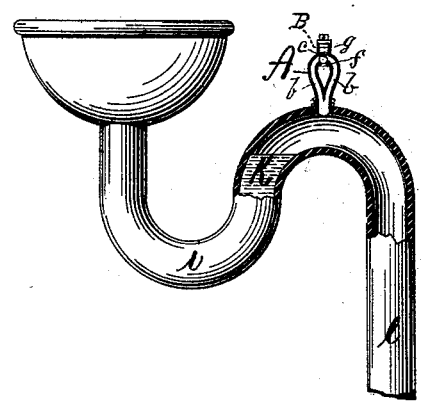
Figure 4:
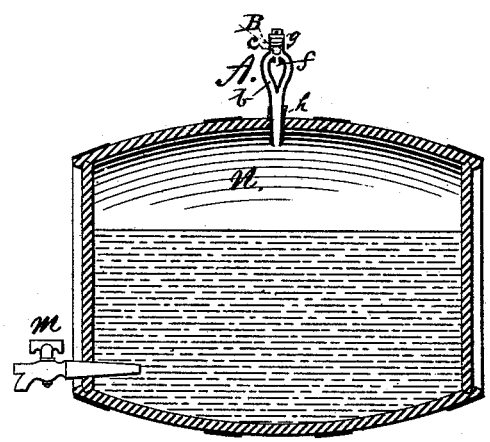

Figure 1 is a sectional view of my improved check-valve, showing the valve, valve-seat, and the plug for removing the valve enlarged. Fig. 2 is a view of my improved check-valve, partly in section, showing its construction when used for venting barrels or other vessels. Fig. 3 is a view, partly in section, showing the connection of my improved check-valve and vent, with a siphon-trap arranged to prevent the siphoning of the trap and the admission of sewer-gases into buildings. Fig. 4 shows the check-valve and vent secured to a barrel.

This invention has reference to improvements in check and vent valves used for preventing the discharge of gases or liquids, and for admitting air to a vessel or trap when required.

The invention consists in the peculiar construction of branch pipes, the valve, and the valve-seat, all of which will be more fully set forth hereinafter.

In the drawings, A represents a device arranged to admit air when a partial vacuum is formed within the same, and to close when pressure exists within it. $b\ b$ are two curved branch pipes, opening from opposite sides into the main pipe or body B above the valve-seat, between the valve $c$ and the disk-guide $d$. Below the valve-seat the branches unite in a central stem or tube, $h$, having a screw-thread on its exterior for insertion in a barrel, &c., giving the whole a heart-shaped appearance. $c$ is a pear-shaped valve provided with the disk $d$. $e\ e$ is the valve-seat, which is preferably narrow, so as to form a certain air-tight seat for the pear-shaped valve $c$, on which nothing can rest to interfere with an air-tight fit. B is the main pipe or body.

The peculiar shape of the valve allows it to find its seat as readily as a globular or ball valve, while it is much more simple in construction.

When pressure exists in the device the valve is held firmly to its seat; but the moment a partial vacuum is produced the atmospheric pressure raises the valve and air enters the vent-opening $f$.

In ordinary valves of this description liquor or liquid is liable to enter under pressure, and as the valve is usually set into a lower depression or neck the liquid is liable to ferment and injure the device and foul the same. By the peculiar construction of this device all liquid will run down the branch pipes $b\ b$, as the valve is at the highest portion of the device. $g$ is a plug closing the orifice through which the valve is inserted, and by which the whole is hermetically secured. $h$ is a stem by which the device may be secured to a barrel or other vessel.

Fig. 3 shows the device connected with the trap of a sink or water-closet for the purpose of excluding the foul and dangerous sewer-gases from the building connected with the sewers. $i$ represents the siphon-trap; $k$, the liquid in the trap, and $l$ the down pipe from the trap. The valve is placed at the highest portion of the trap.

Sewer-gases usually enter houses through the trap when the water has been drawn down by the draft of the water in the down pipe, lowering the water or liquid in the trap, and thus destroying the water-seal. When my improved check valve and vent are secured to the sewer-trap as shown in Fig. 3, air is freely admitted to the trap when water or other liquid is passing down the pipe $l$ or the trap overflows; but at the least internal pressure the valve closes, and thus prevents the discharge of the gases into the building; and as by the admission of air into the trap the draft-pipe $l$ cannot affect the water or liquid in the trap by siphoning a perfect water-seal is maintained and the sewer-gases cannot enter the building through the trap.

For barrels or other vessels containing liquid under pressure, or in which the liquor is liable, by fermentation, to produce pressure, the improved check-valve A may be secured as shown in Fig. 4, in which $m$ is the draw-cock and $n$ the barrel. As long as there is any internal pressure the check-valve will be closed, but as soon as the pressure ceases and liquid is drawn the valve opens and admits air.

I am aware that vents have been heretofore used for the above purposes, and I do not claim the application, broadly; but my improved device differs in construction and is more efficient than valves as heretofore constructed.

The device can be readily secured by hand into a barrel, and a rod or stick can be inserted into the central opening at $g$ to assist in screwing it in or removing the same.

Having thus described my invention, I claim as new and desire to secure by Letters Patent—

1. A vent and check valve having branch pipes $b\ b$ leading from the main pipe or body B above the valve-seat between the valve $c$ and the disk-guide $d$, the branches uniting with a central tube, $h$, having a screw-thread on its exterior for insertion in a barrel or vessel, the valve-seat having the vent-opening between the branch pipes, and the main pipe or body being closed above with a screw-plug, all substantially as and for the purpose described.

2. The combination, in a vent and check valve, of the valve $c$, having a disk-guide, $d$, branch pipes $b\ b$, entering the main pipe or body between the valve $c$ and disk-guide $d$, with the valve-seat having a vent-opening, substantially as and for the purpose described.

FREDERICK RICHARDSON.

Witnesses:
JOSEPH A. MILLER,
JOSEPH A. MILLER, Jr.